United States Patent
Khatri et al.

(10) Patent No.: US 10,521,509 B2
(45) Date of Patent: Dec. 31, 2019

(54) SNIPPET GENERATION AND ITEM DESCRIPTION SUMMARIZER

(71) Applicant: eBay Inc., San Jose, CA (US)

(72) Inventors: Chandra Prakash Khatri, San Jose, CA (US); Selcuk Kopru, Santa Clara, CA (US); Nish Parikh, Fremont, CA (US); Justin Nicholas House, San Jose, CA (US); Sameep Navin Solanki, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/237,091

(22) Filed: Aug. 15, 2016

(65) Prior Publication Data
US 2018/0046611 A1 Feb. 15, 2018

(51) Int. Cl.
G06F 17/27 (2006.01)
G06F 17/24 (2006.01)
G06F 16/36 (2019.01)
G06F 16/33 (2019.01)
G06F 16/34 (2019.01)

(52) U.S. Cl.
CPC ........ *G06F 17/277* (2013.01); *G06F 16/3349* (2019.01); *G06F 16/345* (2019.01);
(Continued)

(58) Field of Classification Search
CPC ...... G06F 17/277; G06F 17/241; G06F 17/24; G06F 17/2735; G06F 17/273;
(Continued)

(56) References Cited

U.S. PATENT DOCUMENTS 5,274,749 A * 12/1993 Evans ................... G06F 17/274
706/55
6,173,251 B1 * 1/2001 Ito ....................... G06F 17/3061
704/10
(Continued)

FOREIGN PATENT DOCUMENTS

WO    2018035089    2/2018

OTHER PUBLICATIONS

"International Application Serial No. PCT US2017 046884, International Search Report dated Nov. 2, 2017", 2 pgs.
(Continued)

*Primary Examiner* — Dwayne D Bost
*Assistant Examiner* — Stephen M Brinich
(74) *Attorney, Agent, or Firm* — Schwegman Lundeberg & Woessner, P.A.

(57) ABSTRACT

In various example embodiments, a system and method for a Target Language Engine are presented. The Target Language Engine augments a synonym list in a base dictionary of a target language with one or more historical search queries previously submitted to search one or more listings in listing data. The Target Language Engine identifies a compound word and a plurality of words present in the listing data that have a common meaning in the target language. Each word from the plurality of words is present in the compound word. The Target Language Engine causes a database to create an associative link between the portion of text and a word selected from at least one of the synonym list or the plurality of words.

17 Claims, 7 Drawing Sheets
(1 of 7 Drawing Sheet(s) Filed in Color)

(52) U.S. Cl.
CPC .......... *G06F 16/374* (2019.01); *G06F 17/241* (2013.01); *G06F 17/2735* (2013.01)

(58) Field of Classification Search
CPC ............. G06F 17/274; G06F 17/30693; G06F 17/30737; G06F 17/2775; G06F 17/278; G06F 17/2785; G06F 17/279; G06F 17/2795; G06F 17/2809; G06F 17/2818; G06F 17/2827; G06F 17/2836; G06F 17/2854; G06F 17/30675; G06F 17/30678; G06F 17/30681; G06F 17/30684; G06F 17/30669; G06F 17/30734; G06F 17/30731
USPC ............ 704/1–10, 256–256.8, 257–258, 266
See application file for complete search history.

(56) References Cited

U.S. PATENT DOCUMENTS

| | | | | |
|---|---|---|---|---|
| 2011/0137893 | A1* | 6/2011 | Shnitko | G06F 17/30675 707/723 |
| 2013/0073571 | A1* | 3/2013 | Coulet | G06F 19/28 707/755 |
| 2013/0110861 | A1* | 5/2013 | Roy | G06F 17/30672 707/765 |
| 2015/0006563 | A1 | 1/2015 | Carattini et al. | |
| 2015/0046435 | A1 | 2/2015 | Donneau-golencer | |
| 2016/0078038 | A1 | 3/2016 | Solanki et al. | |

OTHER PUBLICATIONS

"International Application Serial No. PCT US2017 046884, Written Opinion dated Nov. 2, 2017", 7 pgs.

International Preliminary Report on Patentability received for PCT Application No. PCT/US2017/046884, dated Feb. 28, 2019, 9 pages.

Nenkova et al., "Automatic Summarization", Foundation and Trends in Information Retrieval, vol. 5 Issues 2-3, 2011, 42 pages.

Das, et al, "A survey on Automatic Text Summarization", Language Technology Institute, Carnegie Mellon University, Nov. 21, 2007, 31 pages.

\* cited by examiner

SNIPPET GENERATION AND ITEM DESCRIPTION SUMMARIZER

TECHNICAL FIELD

The subject matter disclosed herein generally relates to the technical field of special-purpose machines that facilitate augmenting a base dictionary and identifying a plurality of words that share a meaning with a compound word, including software-configured computerized variants of such special-purpose machines and improvements to such variants, and to the technologies by which such special-purpose machines become improved compared to other special-purpose machines that facilitate the augmenting a base dictionary and identifying a plurality of words that share a meaning with a compound word.

BACKGROUND

Many conventional websites that provide web content are accessible via mobile devices. The web content can be reformatted for display on a mobile device. Such reformatting allows a user of a mobile device to use their finger on the display screen to scroll through and view the web content. In some conventional systems, the web content is presented according to a different content layout that is suitable of mobile device display. For example, the web content includes multiple images that are concurrently displayed when accessed from a personal computer or laptop. However, when accessed by a mobile device, a single image may be initially displayed and each additional image can be subsequently displayed in response to the user pressing their finger on a currently displayed image. Different content layouts for mobile devices also include defining new display positions for various portions of the web content in order to optimize display of the web content on a mobile device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various ones of the appended drawings merely illustrate example embodiments of the present disclosure and cannot be considered as limiting its scope.

Figure 1:
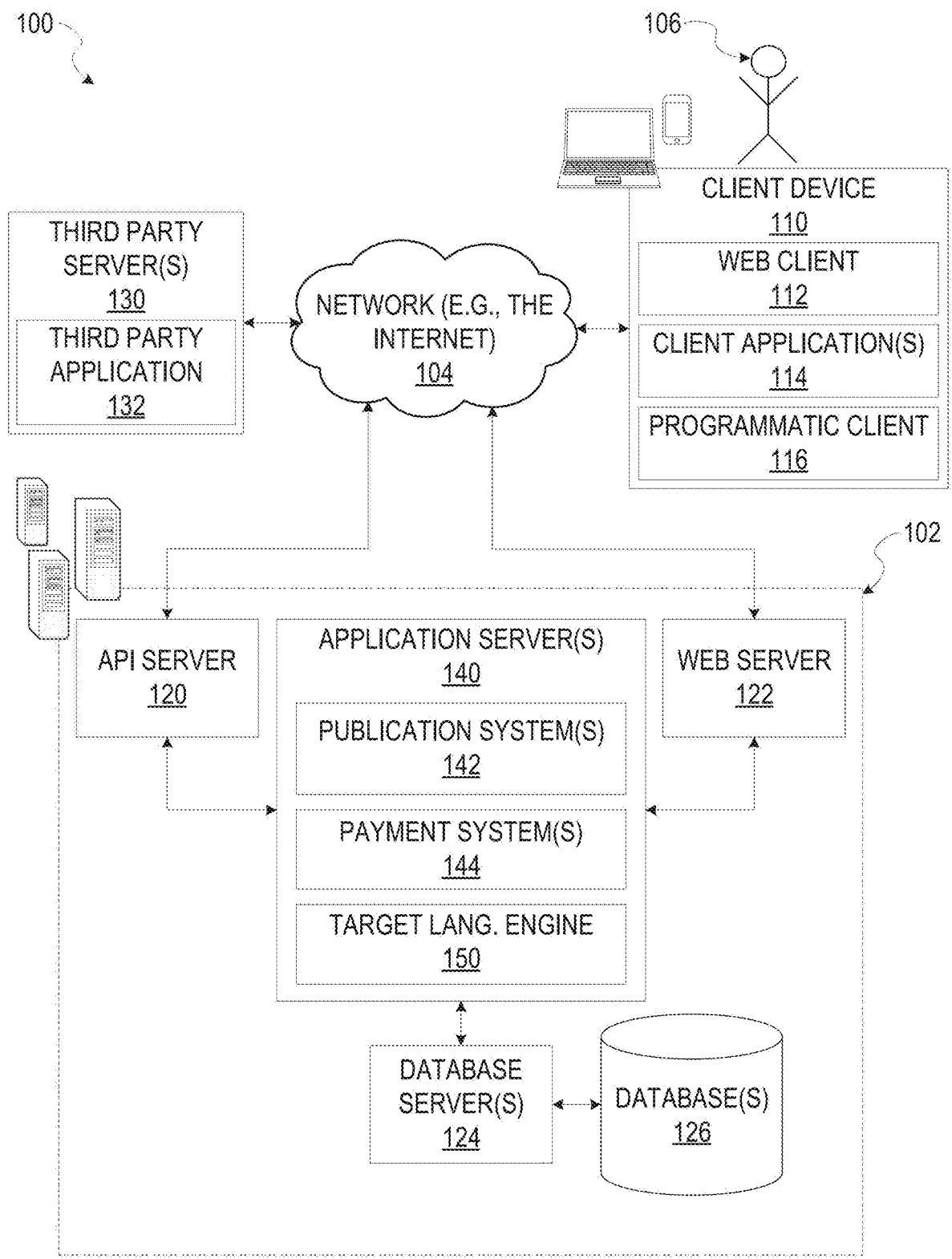
FIG. 1 is a block diagram illustrating a networked system, according to some example embodiments.

The headings provided herein are merely for convenience and do not necessarily affect the scope or meaning of the terms used.

DETAILED DESCRIPTION

The description that follows describes systems, methods, techniques, instruction sequences, and computing machine program products that illustrate example embodiments of the disclosure. In the following description, for the purposes of explanation, numerous specific details are set forth in order to provide an understanding of various embodiments of the inventive subject matter.

In various example embodiments, a Target Language Engine augments a synonym list in a base dictionary of a target language with one or more historical search queries previously submitted to search one or more listings in listing data. The Target Language Engine identifies a compound word and a plurality of words present in the listing data that have a common meaning in the target language. Each word from the plurality of words is present in the compound word.

The Target Language Engine causes a database to create an associative link between the portion of text and a word selected from at least one of the synonym list or the plurality of words. For example, an associative link in the database can be a relationship between a synonym of a word present in the portion of text and the portion of text such that the synonym is accounted for when scoring the portion of text according to a text scoring algorithm. The associative link in the database can be a relationship between a plurality of words and the portion of text such that the plurality of words are accounted for when scoring the portion of text.

The Target Language Engine analyzes one or more portions of text (such as sentences) extracted from a given listing in order to calculate a relevance score of the extracted text. The relevance score of extracted text is based on one or more synonyms in the synonym list for words that appear in the extracted text. The relevance score is further based on identifying a plurality of individual words that share a meaning in the target language with an instance of a compound word that appears in the extracted text. One or more portions of extracted text that have a respective score that satisfies a score threshold are selected for inclusion in a snippet for the given listing.

The Target Language Engine generates the listing snippet that includes the most relevant extracted text. A listing snippet is a partial view of the given listing suitable for display on a mobile device. By displaying a listing snippet on a display of a mobile device, the most relevant content of a listing is presented to a user of the mobile device and the end-user experience is greatly improved thereby increasing user engagement. While conventional systems may reformat the layout of web content for mobile devices, conventional systems fail to identify the most relevant content for display on a mobile device.

It is understood that a portion of text extracted from a given listing can be one or more sentences, a plurality of strings, and a plurality of tokens. A sentence includes one or more words (or strings).

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The Target Language Engine 150 provides functionality operable to determine synonyms and one or more pluralities of individual words to be accounted for during scoring one or more portion of text. For example, the Target Language Engine 150 accesses the databases 126, the third party servers 130, the publication system 120, and other sources. In some example embodiments, the Target Language Engine 150 may communicate with the publication systems 120 (e.g., accessing item listings) and payment system 122. In an alternative embodiment, the Target Language Engine 150 may be a part of the publication system 120.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and Target Language Engine 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
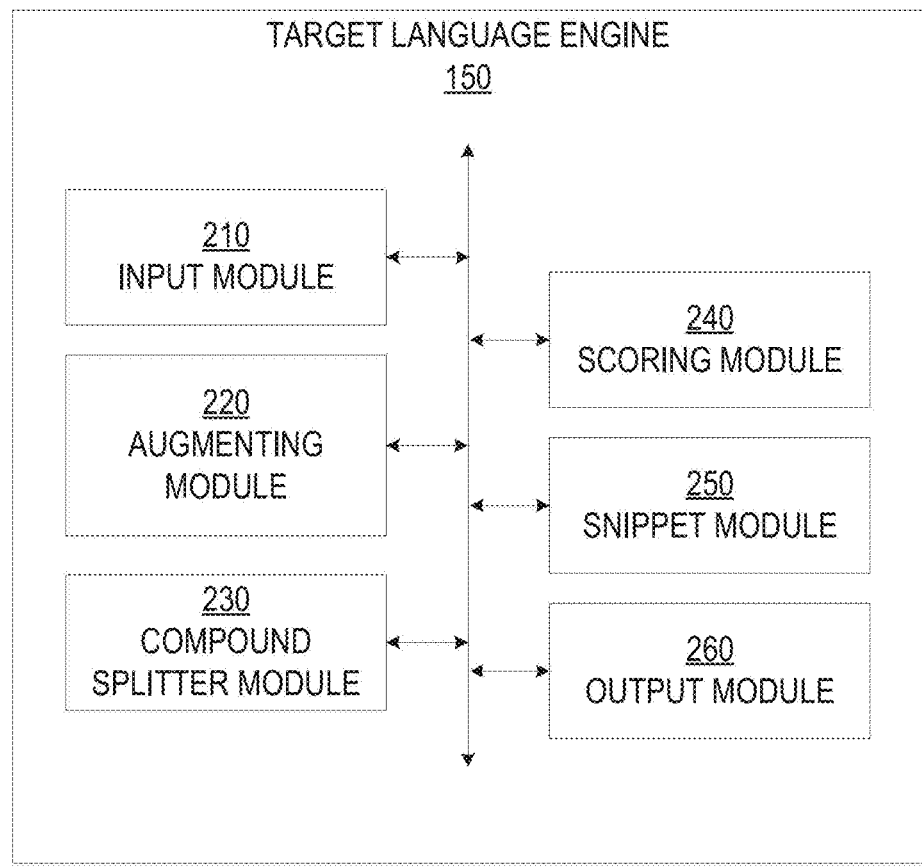
FIG. 2 is a block diagram showing example components of a Listing Engine according to an example embodiment.

FIG. 2 is a block diagram showing example components of a Listing Engine 150 according to an example embodiment. While the modules 210, 220, 230, 240, 250 and 260 are described as performing specific operations, one of ordinary skill in the art will appreciate that such modules may be configured to perform alternative and/or additional operations.

In one example embodiment, the input module 210 is a hardware-implemented module that controls, manages and stores information related to any inputs from one or more components of system 102 as illustrated in FIG. 1. In various example embodiments, input can be one or more listings, listing data, historical data (such as historical search queries), a base dictionary of a target language and one or more portions of text extracted from a given listing.

In one example embodiment, the augmenting module 220 is a hardware-implemented module which manages, controls, stores, and accesses information related to adding words and synonyms to a base dictionary of a target language. In various example embodiments, the Target Language Engine 150 adds words, new words, synonyms, and new synonym lists to the based dictionary according historical search queries and portions of historical search queries.

In one example embodiment, the compound splitter module 230 is a hardware-implemented module which manages, controls, stores, and accesses information related to identifying a compound word and a plurality of individual words have a shared meaning in a target language. In example embodiments, the compound splitter module 230 receives as input a compound word present in a portion of text extracted from a given listing. The compound splitter module 230 identifies a plurality of words that share a meaning in a target language with the compound word.

In one example embodiment, the scoring module 240 is a hardware-implemented module which manages, controls, stores, and accesses information related to scoring a portion of extracted text. In example embodiments, scoring of a portion of text extracted from a given listing will account for one or more synonyms of a word present in the extracted text. In addition, scoring of a portion of text extracted from a given listing will account for a plurality of individuals that share the same meaning with a compound word present in the extracted text. It is understand that various text scoring algorithms can be implemented to score portions of texts extracted from a given listing.

In one example embodiment, the snippet module 250 is a hardware-implemented module which manages, controls, stores, and accesses information related to generating a snippet for display on a mobile device. In various example embodiments, the snippet module 250 identifies one or more portions of text extracted from a given listing that have a respective relevance score that meets a score requirement, such as a score threshold. Those portions of text which meet the score requirement are selected by the snippet module 250 for inclusion in a snippet. The snippet module 250 renders or triggers rendering of the snippet for display on a mobile device.

In one example embodiment, the output module 260 is a hardware-implemented module that controls, manages and stores information related to which sends any outputs to one or more components of system 100 of FIG. 1 (e.g., one or more client devices 110, 112, third party server 130, etc.) or to one more components of system 102 of FIG. 1. In some example embodiments, the output is is a snippet for a given listing. The output can also be a rendered snippet for a given listing.

Figure 3:
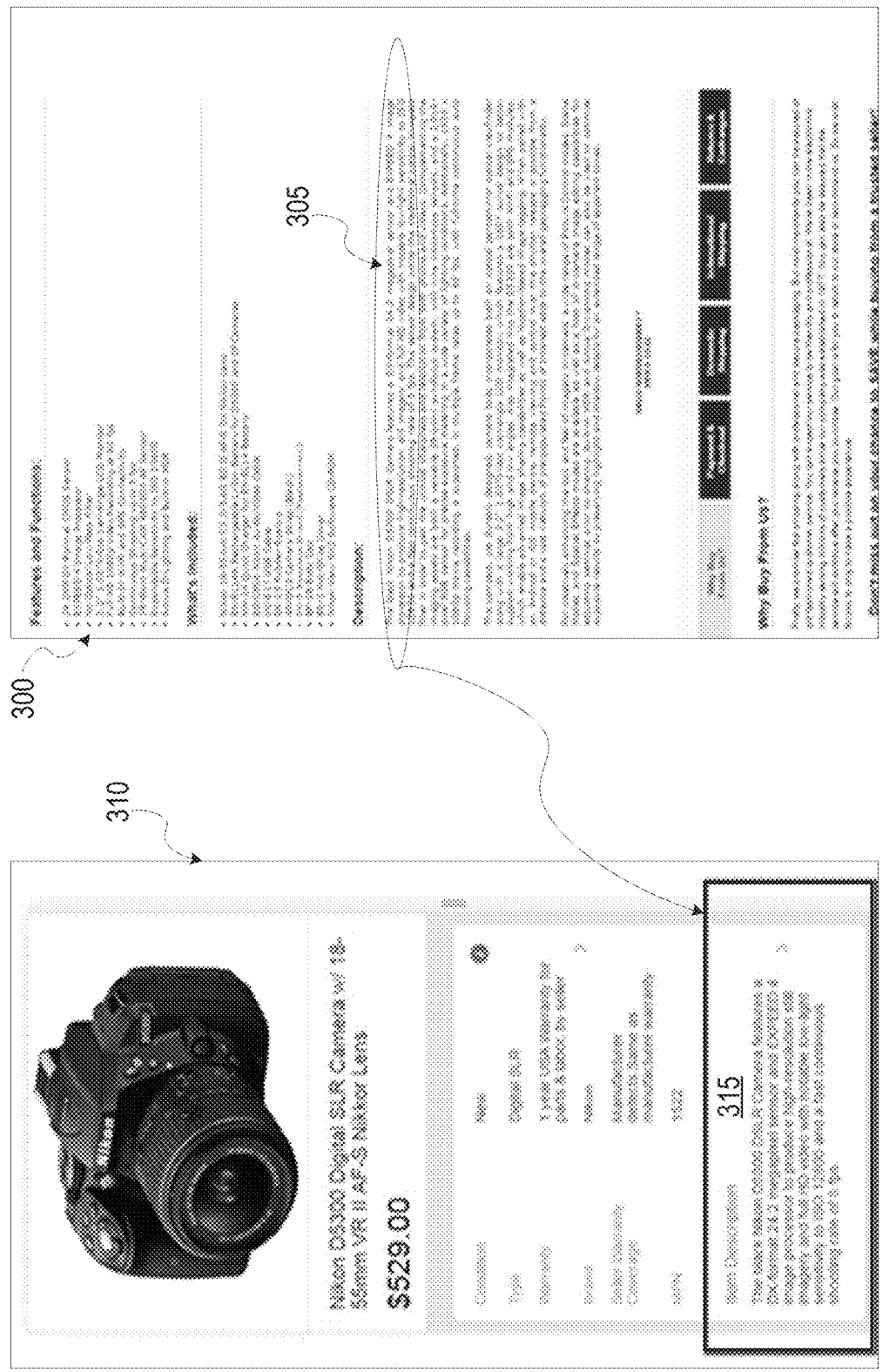
FIG. 3 is a block diagram illustrating a snippet for a given listing according to an example embodiment.

FIG. 3 is a block diagram illustrating a snippet for a given listing according to an example embodiment.

In various example embodiments, the Target Language Engine 150 accesses a listing 300 that includes web content describing an item for sale. The structure of the listing 300 is based on a pre-defined listing structure with one or more types of listing sections. Various listing sections are, for example, a Title, a Product Description, item features, item functions, accessory description and structural information (brand, model number, Stock Keeping Unit (SKU) number, and technical specifications). The text of each section of a given listing are analyzed by the Target Language Engine 150 to generate a listing snippet 310.

A listing snippet 310 is a partial view of the web content of the given listing 300 suitable for display on a mobile device. The Target Language Engine 150 scores text from one or more sections of the given listing 300 to determine which portions of text include the most relevant text 305. The Target Language Engine 150 generates a listing snippet 310 for the given listing 300 that includes the most relevant text portion 305. The most relevant text portion 305 is included in a description section 315 of the listing snippet 310.

According to example embodiments, to score the one or more listing sections of the given listing 300, the Target Language Engine 150 extracts one or more sentences from the listing sections and discards those sentences that exceed a maximum length or fail to meet a minimum length. In addition, the Target Language Engine 150 compares the text in the remaining (non-discarded) sentences against a list of unnecessary words (hereinafter "blacklist"). Based on detecting that a word from the blacklist appears in a sentence, the Target Language Engine 150 modifies the sentence by deleting the blacklist word from the sentence. The Target Language Engine 150 also compares the text in the remaining (non-discarded) sentences to a list of topic keywords. The list of topic keywords are pre-determined as words that are typically highly relevant. Topic keywords can have an inverse document frequency ("IDF") score throughout a corpus of the listing data that meets a minimum IDF score. The more topic keywords that appear in a given extracted sentence, the higher the relevance score for the given sentence. Such scoring calculation can also account for synonyms of words present in an extracted sentence and for any compound word in an extracted sentence.

In some example embodiments, the Target Language Engine 150 augments one or more synonym lists in a base dictionary of the target language to build a robust amount of synonyms that are relevant to listings in the listing data. The Target Language Engine 150 also inserts new synonyms and new synonym lists in the base dictionary. The Target Language Engine 150 augments the base dictionary to include historical search queries (or portions of historical search queries) previously submitted to search the listing data. In addition, the Target Language Engine 150 builds and trains the compound splitter module 230 in order to identify when a compound word and a plurality of individual words share the same meaning in the target language. The compound splitter module 230 receives as input a portion of text (such as a sentence) that includes an instance of a compound word and the compound splitter module 230 identifies a plurality of words that can be used for scoring the portion of text.

Therefore, a sentence extracted from a given listing can be scored as highly relevant based on a synonym of one or more words in the sentence. In addition, scoring calculation can also be based on a plurality of individual words in a compound word when a sentence includes an instance of the compound word.

Figure 4:
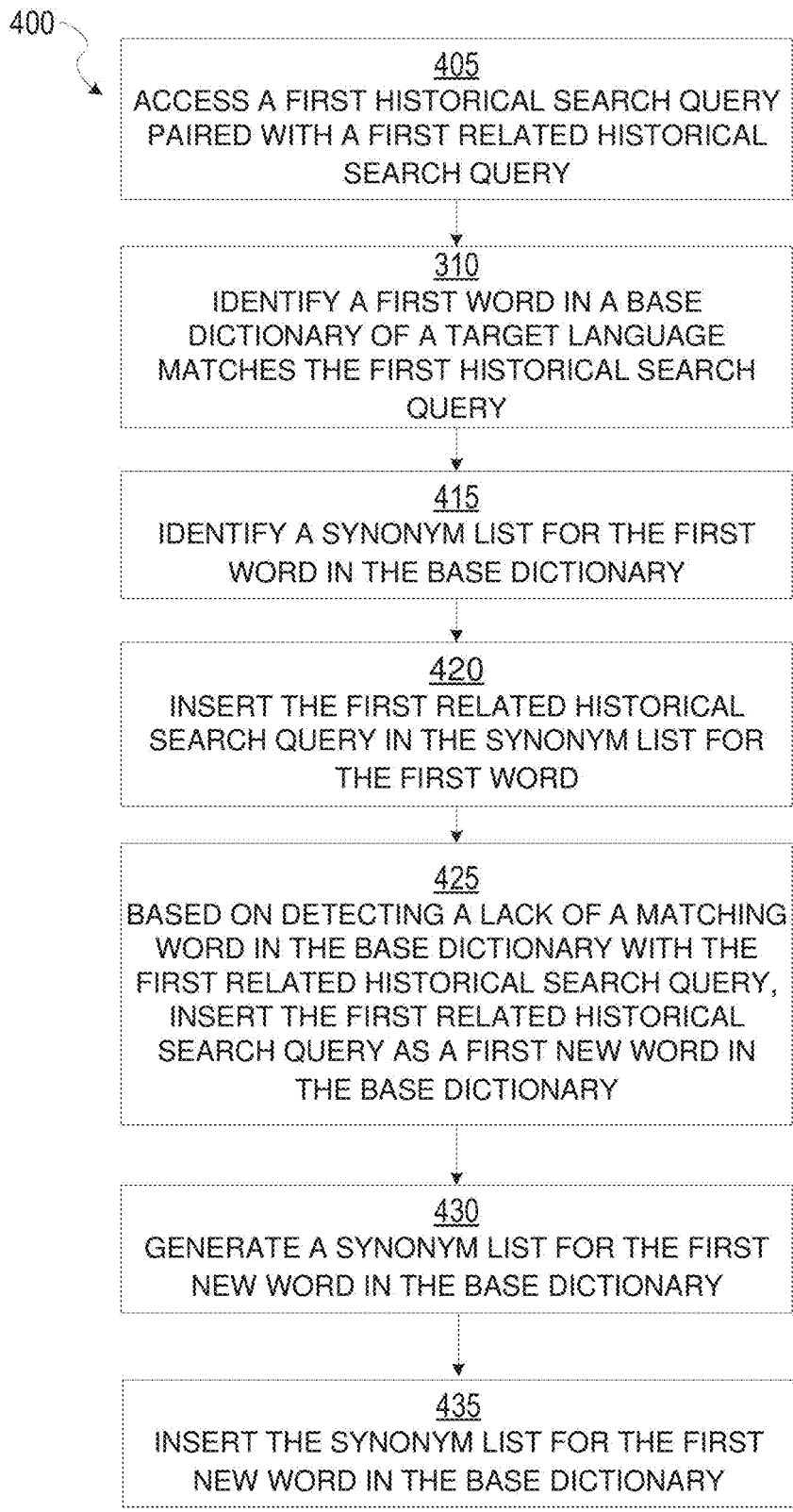
FIG. 4 is a flow diagram illustrating a method of augmenting a base dictionary, in accordance with an example embodiment.

FIG. 4 is a flow diagram illustrating a method 400 of augmenting a base dictionary, in accordance with an example embodiment. It is understood that the method 400 illustrated by FIG. 4 can be implemented by the augmenting module 220 of the Target Language Engine 150.

At operation 405, the Target Language Engine 150 accesses a first historical search query paired with a first related historical search query. The first historical search query and the first related historical search query corresponding to a first set of historical user behaviors after search query submission.

At operation 410, the Target Language Engine 150 identifies a first word in a base dictionary of a target language matches a first historical search query. The base dictionary includes a plurality of different words commonly used in the target language.

In example embodiments, the Target Language Engine 150 accesses a plurality of historical search query mappings in a target language in order to increase the amount of synonyms listed in the base dictionary. An historical search query mapping represents that two or more historical search queries (or query portions) are synonyms. Such a determination that synonyms exists between historical search queries is based on user behaviors made in response to search results for each historical search query in the historical search query mapping. Determination of the existence of synonyms between historical search queries is thereby based on the assumption that while two words may be different, they most likely have the same meaning if the users who submitted the search queries behave in a similar manner after submitting the search queries. Such behaviors can include user selections (link clicks, functionality selection), types of content viewed and purchase activity (such as placing an item into a virtual shopping cart, initiating a purchase of an item).

For example, a historical search query mapping is generated by the Target Language Engine 150 based on a first user's interaction with a first list of search results returned for a first search query. The first user selected a search result that was a reference to a webpage describing a particular item. A second user submitted a second search query that was different than the first search query. The second user received a second list of search results for the second search query. The second user selected a search result that was also a reference to a webpage describing the same particular item. Such similarity in search result selection by both users is a factor in determining whether the first search query (or a portion of it) can be identified as a synonym of the second search query (or a portion of it). When such behaviors of both the first and second users meet a threshold degree of similarity after submission of their respective first and second search queries, a historical search query mapping is generated by the Target Language Engine 150 to include the first and second search queries. In an example embodiment, an historical search query mapping can include one or more words from the first search query and one or more words from the second search query. An historical search query mapping can include any number of distinct historical search queries.

At operation 415, the Target Language Engine 150 identifies a synonym list for the first word in the base dictionary. For example, the Target Language Engine 150 augments the base dictionary with at least a portion of the plurality of historical search query mappings. The base dictionary includes base synonym lists, each base synonym list includes words that are commonly known in the target language to be synonyms of each other. The Target Language Engine 150 accesses a first historical search query mapping, which includes the first search query and a first related historical search query. The Target Language Engine 150 determines the first search query matches a word in the base dictionary.

At operation 420, the Target Language Engine 150 inserts the first related historical search query in the synonym list for the first word. For example, if the first related historical search query is not listed in the matching word's base synonym list, the Target Language Engine 150 inserts the first related historical search query into the matching word's base synonym list.

At operation 425, based on detecting a lack of a matching word in the base dictionary with the first related historical search query, the Target Language Engine 150 inserts the first related historical search query as a first new word in the base dictionary. For example, while the first related historical search query has been inserted into the base synonym list of the word that matches the first search query, the Target Language Engine 150 determines whether the first related historical search query is itself listed as a word in the base dictionary. If no match is found, Target Language Engine 150 insert the first related historical search query as a first new word in the base dictionary.

At operation 430, the Target Language Engine 150 generates a synonym list for the first new word in the base dictionary. For example, the Target Language Engine 150 instantiates a synonym list for the first new word in the base dictionary. The synonym list for the first new word includes the original synonym list for the matching word, the matching word itself and the first search query.

At operation 435, the Target Language Engine 150 inserts the synonym list for the first new word in the base dictionary.

In example embodiments, the Target Language Engine 150 accesses second historical search query mappings, which includes a second historical search query paired with a second related historical search query. The second historical search query and the second related historical search query are classified by the Target Language Engine 150 as synonyms based on a second set of historical user behaviors that occurred after both queries were submitted. The Target Language Engine 150 detects a lack of a matching word in the base dictionary with the second historical search query and inserts the second historical search query as a second new word in the base dictionary. Target Language Engine 150 generates a synonym list for the second new word in the base dictionary. The synonym list for the second new word includes the second related historical search query present in the second historical search query mapping. The Target Language Engine 150 inserts the synonym list for the second new word in the base dictionary. The Target Language Engine 150 inserts the second related historical search query as a third new word in the base dictionary. The Target Language Engine 150 generates a synonym list for the third new word in the base dictionary. The synonym list for the third new word includes the second historical search query. The Target Language Engine 150 inserts the synonym list for the third new word in the base dictionary. The Target Language Engine 150 thereby increases the number of synonyms in the base dictionary of the target language to also include search queries deemed to have similar meaning on the basis of similarity of previous behaviors of users who submitted those search queries.

According to example embodiments performing operations 405-435, the Target Language Engine 150 accesses an historical search query of "transistorfassung", which has a plurality of related historical search queries of: "transistor", "fassung", "fassungen", "transistoren". The Target Language Engine 150 determines that there is no match in a base dictionary of the target language for "transistorfassung". In response to determining there is no match, the Target Language Engine 150 inserts "transistorfassung" into the base dictionary as a first new word. The Target Language Engine 150 instantiates a first synonym list for the first new word. The instantiated first synonmym list includes "transistor", "fassung", "fassungen", "transistoren".

The Target Language Engine 150 performs the same operations with respect to each related historical search query as well. For example, the Target Language Engine 150 determines that there is no match in the base dictionary for "fassungen". In response to determining there is no match, the Target Language Engine 150 inserts "fassungen" into the base dictionary as a second new word. The Target Language Engine 150 instantiates a second synonym list for the second new word. The instantiated second synonmym list includes "transistor", "fassung", "transistorfassung", "transistoren".

Figure 5:
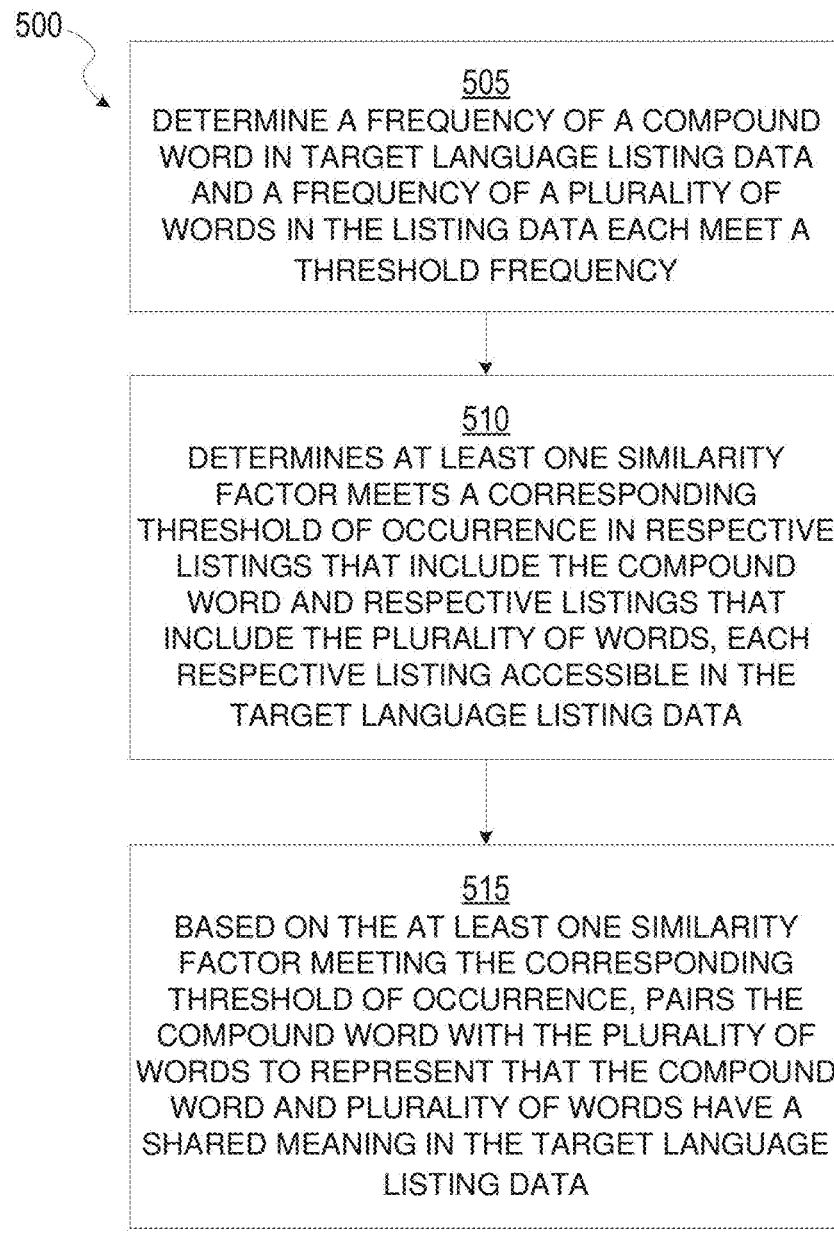
FIG. 5 is a flow diagram illustrating a method of building and training compound splitter module, in accordance with an example embodiment.

FIG. 5 is a flow diagram illustrating a method 500 of building and training compound splitter module 230, in accordance with an example embodiment. It is understood that the method 500 illustrated by FIG. 5 can be implemented by the compound splitter module 230 of the Target Language Engine 150.

At operation 505, the Target Language Engine 150 determines a frequency of the compound word in target language listing data and a frequency of the plurality of words in the listing data each meet a threshold frequency. For example, in addition to augmenting the base dictionary of the target language with additional synonyms and additional synonym lists, the Target Language Engine 150 builds and trains a compound splitter module 230 that receives as input a compound word (for example: "granitpflastersteine") of the target language and returns as output a plurality of individual words (for example: "granit" "pflaster" "steine") that combine to form the input compound word. The plurality of individual words and the compound word both have the same meaning according to the target language.

However, if the compound word is partially split (for example: "granit pflastersteine"), the target language assigns the partially split compound word a different meaning—even though the compound word and the plurality of individual words have the same meaning. The Target Language Engine trains the compound splitter module 230 to output individual words that have the same meaning as the input compound word by differentiating when partially split compound words have a different meaning. Therefore, the compound splitter module 230 avoids providing as output a partially split compound word that has a different meaning than an input compound word.

The compound splitter module 230 is trained on historical listing data that includes a plurality of listings of items for sale. The Target Language Engine 150 determines that a compound word (for example: "granitpflastersteine") and a plurality of individual words (for example: "granit" "pflaster" "steine") have the same meaning based on their respective number of occurrences in the plurality of listings of items meeting a threshold frequency. In other words, if the compound word's frequency of occurrence and the frequency of occurrence for the plurality of individual words both meet the threshold frequency, it can be assumed that compound word and the plurality of individual words are each regularly used in the target language according to some underlying meaning.

At operation 510, the Target Language Engine 150 determines at least one similarity factor meets a corresponding threshold of occurrence in respective listings that include the compound word and respective listings that include the plurality of words, each respective listing accessible in the target language listing data.

For example, to add entries in the compound splitter module 230, Target Language Engine 150 analyzes listings in which the compound word occurs and listings in which the plurality of individual words occur and identifies factors that indicate the compound word and the plurality of words most likely have the same meaning in the target language. For example, a similarity factor can be whether a Stock Keeping Identifier (SKU) number is common to listings that include the compound word and listings that include the plurality of individual words. Another similarity factor can be how often the compound word and the plurality of individual words occur in titles of the respective listings. Another similarity factor can be whether a product category descriptor is common to listings that include the compound word and listings that include the plurality of individual words. Another similarity factor can be whether a brand (or manufacturer) descriptor is common to listings. Each similarity factor must meet a corresponding threshold of occurrence to be considered relevant in determining whether the compound word and the plurality of words have the same meaning.

At operation 515, based on the at least one similarity factor meeting the corresponding threshold of occurrence, the Target Language Engine 150 pairs the compound word with the plurality of words in the compound splitter module 230 to represent that the compound word and plurality of words have a shared meaning in the target language listing data.

For example, if a threshold number of similarity factors each meet their corresponding threshold of occurrence, the Target Language Engine 150 determines that the compound word and the plurality of words have the same meaning. The Target Language Engine 150 inserts the compound word paired with the plurality of words into the compound splitter module 230, where the pairing represents that compound word and the plurality of words have the same meaning.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-7 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 6:
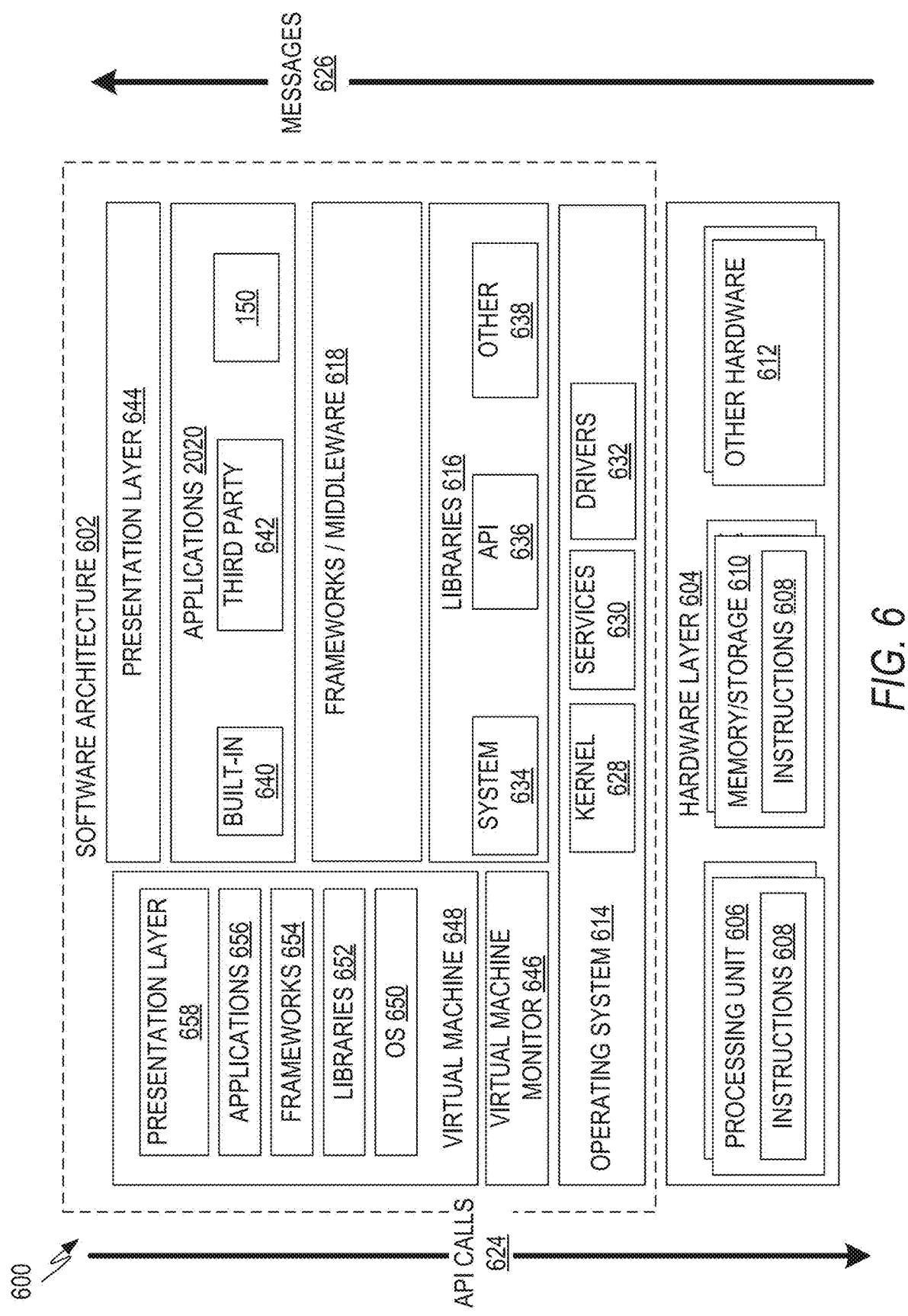
FIG. 6 is a block diagram illustrating an example of a software architecture that may be installed on a machine, according to some example embodiments.

FIG. 6 is a block diagram 600 illustrating a representative software architecture 602, which may be used in conjunction with various hardware architectures herein described. FIG. 6 is merely a non-limiting example of a software architecture and it will be appreciated that many other architectures may be implemented to facilitate the functionality described herein. The software architecture 602 may be executing on hardware such as machine 700 of FIG. 7 that includes, among other things, processors 710, memory 730, and I/O components 750. A representative hardware layer 604 is illustrated and can represent, for example, the machine 700 of FIG. 7. The representative hardware layer 604 comprises one or more processing units 606 having associated executable instructions 608. Executable instructions 608 represent the executable instructions of the software architecture 602, including implementation of the methods, modules and so forth of FIGS. 2-5. Hardware layer 604 also includes memory and/or storage modules 610, which also have executable instructions 608. Hardware layer 604 may also comprise other hardware as indicated by 612 which represents any other hardware of the hardware layer 604, such as the other hardware illustrated as part of machine 700.

In the example architecture of FIG. 6, the software 602 may be conceptualized as a stack of layers where each layer provides particular functionality. For example, the software 602 may include layers such as an operating system 614, libraries 616, frameworks/middleware 618, applications 620 and presentation layer 622. Operationally, the applications 620 and/or other components within the layers may invoke application programming interface (API) calls 624 through the software stack and receive a response, returned values, and so forth illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be utilized by the applications 620 and/or other software components/modules. For example, the frameworks 618 may provide various graphic user interface (GUI) functions, high-level resource management, high-level location services, and so forth. The frameworks 618 may provide a broad spectrum of other APIs that may be utilized by the applications 620 and/or other software components/modules, some of which may be specific to a particular operating system or platform.

The applications 620 includes built-in applications 640 and/or third party applications 642. Examples of representative built-in applications 640 may include, but are not limited to, a contacts application, a browser application, a book reader application, a location application, a media application, a messaging application, and/or a game application. Third party applications 642 may include any of the built in applications as well as a broad assortment of other applications. In a specific example, the third party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 642 may invoke the API calls 624 provided by the mobile operating system such as operating system 614 to facilitate functionality described herein.

The applications 620 may utilize built in operating system functions (e.g., kernel 628, services 630 and/or drivers 632), libraries (e.g., system 634, APIs 636, and other libraries 638), frameworks/middleware 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware machine (such as the machine of FIG. 7, for example). A virtual machine is hosted by a host operating system (operating system 614 in FIG. 6) and typically, although not always, has a virtual machine monitor 646, which manages the operation of the virtual machine as well as the interface with the host operating system (i.e., operating system 614). A software architecture executes within the virtual machine such as an operating system 650, libraries 652, frameworks/middleware 654, applications 656 and/or presentation layer 658. These layers of software architecture executing within the virtual machine 648 can be the same as corresponding layers previously described or may be different.

Example Machine Architecture and Machine-Readable Medium

Figure 7:
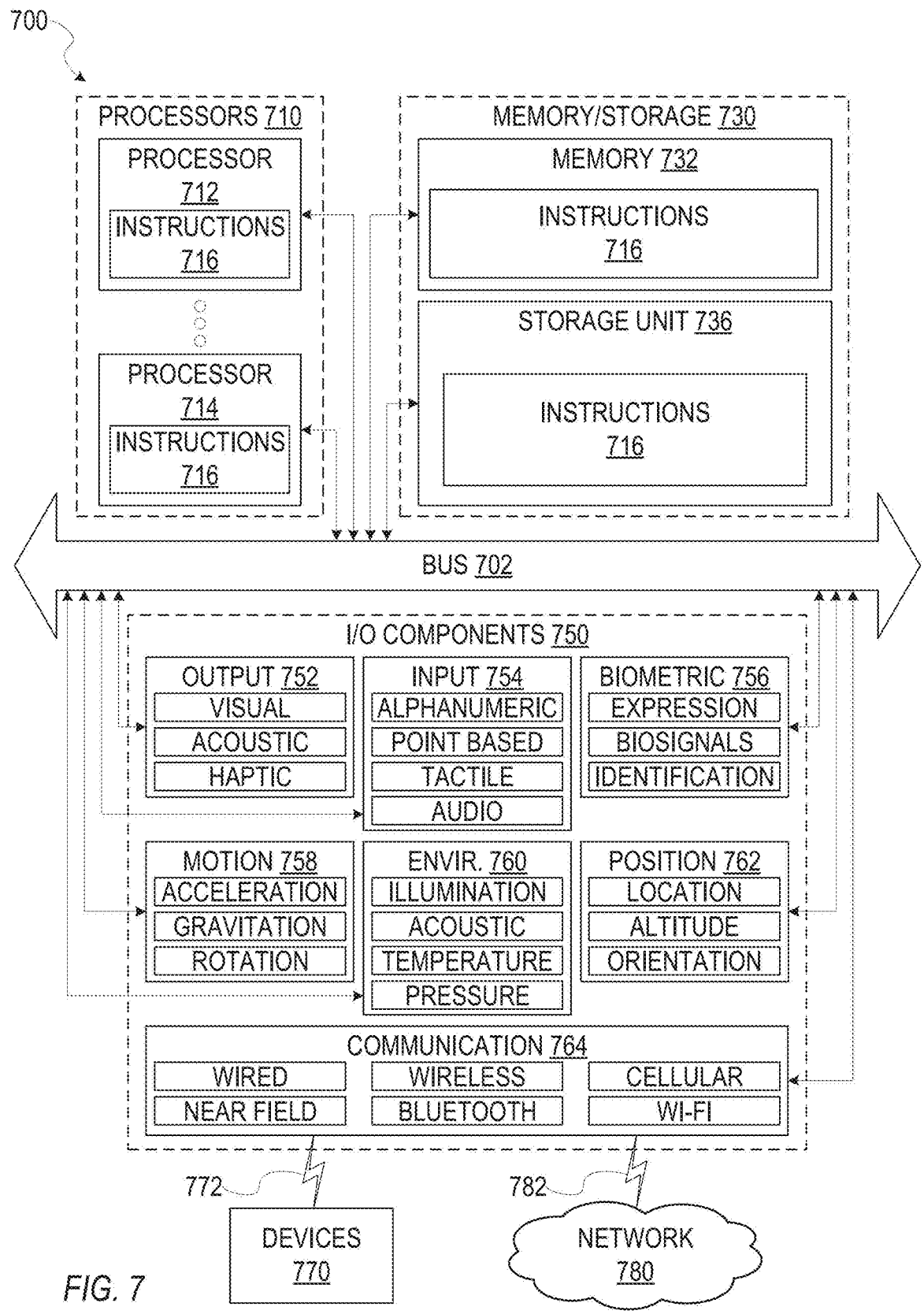
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example the instructions may cause the machine to execute the flow diagrams of FIGS. 4 and 5. Additionally, or alternatively, the instructions may implement the actions and modules of FIGS. 2 and 3, and so forth. The instructions transform the general, non-programmed machine into a particular machine programmed to carry out the described and illustrated functions in the manner described. In alternative example embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 712 and processor 714 that may execute instructions 716. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core process), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772 respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these example embodiments without departing from the broader scope of example embodiments of the present disclosure. Such example embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of example embodiments of the present disclosure as represented by the appended claims. The specification and drawings are, accordingly, to be regarded in an illustrative rather than a restrictive sense.

What is claimed is:

1. A computer system comprising:
    at least one processor;
    a non-transitory computer-readable medium storing an instruction set executable on the at least one processor to cause the computer system to perform operations comprising:
    identifying a compound word and a plurality of words present in listing data that have a common meaning, each word from the plurality of words being present in the compound word, the identifying of the compound word and the plurality of words comprising:
        determining a frequency of the compound word in the listing data and a frequency of the plurality of words in the listing data each meet a threshold frequency;
        determining at least one similarity factor meets a corresponding threshold of occurrence in respective listings that include the compound word and respective listings that include the plurality of words, each respective listing accessible in the listing data; and
        based on the at least one similarity factor meeting the corresponding threshold of occurrence, pairing the compound word with plurality of words to represent the shared meaning in the listing data;
    causing a database to create an associative link between the portion of text and a word selected from at least one of the synonym list or the plurality of words; and
    communicating a snippet for displaying on a mobile device, the snippet selected based on a relevance score that takes into account the associative link, the snippet including a portion of the listing data corresponding to a sentence that includes an instance of the compound word, the snippet being a partial view of the listing data that is suitable for display on the mobile device.

2. The computer system of claim 1, wherein the operations further comprise augmenting a synonym list in a base dictionary of a target language with a historical search query previously submitted to search one or more listings in the listing data, wherein the augmenting of the synonym list in the base dictionary of the target language with the historical search query previously submitted to search one or more listings in listing data comprises:
    accessing a first historical search query paired with a first related historical search query, the first historical search query and the first related historical search query corresponding to a first set of historical user behaviors after search query submission;
    identifying a first word in a base dictionary of a target language matches the first historical search query, the base dictionary including a plurality of different words common in the target language;
    identifying a synonym list for the first word in the base dictionary;
    inserting the first related historical search query in the synonym list for the first word;
    based on detecting a lack of a matching word in the base dictionary with the first related historical search query, inserting the first related historical search query as a first new word in the base dictionary;
    generating a synonym list for the first new word in the base dictionary, the synonym list for the first new word including each word in the synonym list for the first word and the first word; and
    inserting the synonym list for the first new word in the base dictionary.

3. The computer system of claim 2, wherein causing a database to create an associative link between the portion of text and a word selected from at least one of the synonym list or the plurality of words comprises:
    identifying in the synonym list a synonym for a word in the portion of text; and
    creating a relationship between the identified synonym to the portion of text and calculating a relevance score for the portion of text based in part on the relationship with the identified synonym.

4. The computer system of claim 2, further comprising:
    accessing a second historical search query paired with a second related historical search query, the second historical search query and the second related historical search query corresponding to a second set of historical user behaviors after search query submission;
    based on detecting a lack of a matching word in the base dictionary with the second historical search query, inserting the second historical search query as a second new word in the base dictionary;
    generating a synonym list for the second new word in the base dictionary, the synonym list for the second new word including the second related historical search query; and
    inserting the synonym list for the second new word in the base dictionary.

5. The computer system of claim 4, further comprising:
    inserting the second related historical search query as a third new word in the base dictionary;
    generating a synonym list for the third new word in the base dictionary, the synonym list for the third new word including the second historical search query; and
    inserting the synonym list for the third new word in the base dictionary.

6. The computer system of claim 2, wherein causing the database to create an associative link between the portion of text and a word selected from at least one of the synonym list or the plurality of words comprises:
    identifying an instance of the compound word in the portion of text;
    creating a relationship between a plurality of words that share a meaning in the target language with the instance of the compound word and the portion of text; and
    calculating a relevance score for the portion of text based in part on the relationship between plurality of words and the portion of text.

7. A computer-implemented method comprising:
identifying a compound word and a plurality of words present in listing data that have a common meaning, each word from the plurality of words present in the compound word, the identifying of the compound word and the plurality of words comprising:
    determining a frequency of the compound word in the listing data and a frequency of the plurality of words in the listing data each meet a threshold frequency;
    determining at least one similarity factor meets a corresponding threshold of occurrence in respective listings that include the compound word and respective listings that include the plurality of words, each respective listing accessible in the listing data; and
    based on the at least one similarity factor meeting the corresponding threshold of occurrence, pairing the compound word with plurality of words to represent the compound word and plurality of words have a shared meaning in the listing data;
causing, via at least one processor, a database to create an associative link between the portion of text and a word selected from at least one of the synonym list or the plurality of words; and
communicating, via the at least one processor, a snippet for displaying on a mobile device, the snippet selected based on a relevance score that takes into account the associative link, the snippet including a portion of the listing data corresponding to a sentence that includes an instance of the compound word, the snippet being a partial view of the listing data that is suitable for display on the mobile device.

8. The computer-implemented method of claim 7, further comprising augmenting a synonym list in a base dictionary of a target language with a historical search query previously submitted to search one or more listings in listing data, wherein augmenting a synonym list in a base dictionary of a target language with a historical search query previously submitted to search one or more listings in listing data comprises:
    accessing a first historical search query paired with a first related historical search query, the first historical search query and the first related historical search query corresponding to a first set of historical user behaviors after search query submission;
    identifying a first word in a base dictionary of a target language matches the first historical search query, the base dictionary including a plurality of different words common in the target language;
    identifying a synonym list for the first word in the base dictionary;
    inserting the first related historical search query in the synonym list for the first word;
    based on detecting a lack of a matching word in the base dictionary with the first related historical search query, inserting the first related historical search query as a first new word in the base dictionary;
    generating a synonym list for the first new word in the base dictionary, the synonym list for the first new word including each word in the synonym list for the first word and the first word; and
    inserting the synonym list for the first new word in the base dictionary.

9. The computer-implemented method of claim 8, wherein causing a database to create an associative link between the portion of text and a word selected from at least one of the synonym list or the plurality of words comprises:
    identifying in the synonym list a synonym for a word in the portion of text;
    creating a relationship between the identified synonym to the portion of text; and
    calculating a relevance score for the portion of text based in part on the relationship with the identified synonym.

10. The computer-implemented method of claim 8, further comprising:
    accessing a second historical search query paired with a second related historical search query, the second historical search query and the second related historical search query corresponding to a second set of historical user behaviors after search query submission;
    based on detecting a lack of a matching word in the base dictionary with the second historical search query, inserting the second historical search query as a second new word in the base dictionary;
    generating a synonym list for the second new word in the base dictionary, the synonym list for the second new word including the second related historical search query; and
    inserting the synonym list for the second new word in the base dictionary.

11. The computer-implemented method of claim 10, further comprising:
    inserting the second related historical search query as a third new word in the base dictionary;
    generating a synonym list for the third new word in the base dictionary, the synonym list for the third new word including the second historical search query; and
    inserting the synonym list for the third new word in the base dictionary.

12. The computer-implemented method of claim 8, wherein causing a database to create an associative link between the portion of text and a word selected from at least one of the synonym list or the plurality of words comprises:
    identifying an instance of the compound word in the portion of text;
    creating a relationship between the plurality of words that share a meaning in the target language with the instance of the compound word and the portion of text; and
    calculating a relevance score for the portion of text based in part on the relationship between plurality of words and the portion of text.

13. A non-transitory computer-readable medium storing executable instructions thereon that, when executed by at least one processor, cause the at least one processor to perform operations including:
    A identifying a compound word and a plurality of words present in listing data that have a common meaning, each word from the plurality of words present in the compound word, the identifying of the compound word and the plurality of words comprising:
        determining a frequency of the compound word in the listing data and a frequency of the plurality of words in the listing data each meet a threshold frequency;
        determining at least one similarity factor meets a corresponding threshold of occurrence in respective listings that include the compound word and respective listings that include the plurality of words, each respective listing accessible in the listing data; and
        based on the at least one similarity factor meeting the corresponding threshold of occurrence, pairing the compound word with plurality of words to represent the compound word and plurality of words have a shared meaning in the listing data;

causing a database to create an associative link between the portion of text and a word selected from at least one of the synonym list or the plurality of words; and communicating a snippet for displaying on a mobile device, the snippet selected based on a relevance score that takes into account the associative link, the snippet including a portion of the listing data corresponding to a sentence that includes an instance of the compound word, the snippet being a partial view of the listing data that is suitable for display on the mobile device.

14. The non-transitory computer-readable medium of claim 13, wherein the operations further comprise augmenting a synonym list in a base dictionary of a target language with a historical search query previously submitted to search one or more listings in listing data, wherein augmenting a synonym list in a base dictionary of a target language with a historical search query previously submitted to search one or more listings in listing data comprises:

accessing a first historical search query paired with a first related historical search query, the first historical search query and the first related historical search query corresponding to a first set of historical user behaviors after search query submission;

identifying a first word in a base dictionary of a target language matches the first historical search query, the base dictionary including a plurality of different words common in the target language;

identifying a synonym list for the first word in the base dictionary;

inserting the first related historical search query in the synonym list for the first word;

based on detecting a lack of a matching word in the base dictionary with the first related historical search query, inserting the first related historical search query as a first new word in the base dictionary;

generating a synonym list for the first new word in the base dictionary, the synonym list for the first new word including each word in the synonym list for the first word and the first word; and inserting the synonym list for the first new word in the base dictionary.

15. The non-transitory computer-readable medium of claim 14, wherein causing a database to create an associative link between the portion of text and a word selected from at least one of the synonym list or the plurality of words comprises:

identifying in the synonym list a synonym for a word in the portion of text;

creating a relationship between the identified synonym to the portion of text; and calculating a relevance score for the portion of text based in part on the relationship with the identified synonym.

16. The non-transitory computer-readable medium of claim 14, further comprising:

accessing a second historical search query paired with a second related historical search query, the second historical search query and the second related historical search query corresponding to a second set of historical user behaviors after search query submission;

based on detecting a lack of a matching word in the base dictionary with the second historical search query, inserting the second historical search query as a second new word in the base dictionary;

generating a synonym list for the second new word in the base dictionary, the synonym list for the second new word including the second related historical search query; and inserting the synonym list for the second new word in the base dictionary.

17. The non-transitory computer-readable medium of claim 16, further comprising:

inserting the second related historical search query as a third new word in the base dictionary;

generating a synonym list for the third new word in the base dictionary, the synonym list for the third new word including the second historical search query; and inserting the synonym list for the third new word in the base dictionary.

* * * * *

UNITED STATES PATENT AND TRADEMARK OFFICE
CERTIFICATE OF CORRECTION

PATENT NO.        : 10,521,509 B2
APPLICATION NO.   : 15/237091
DATED             : December 31, 2019
INVENTOR(S)       : Chandra Prakash Khatri et al.

Page 1 of 1

It is certified that error appears in the above-identified patent and that said Letters Patent is hereby corrected as shown below:

In the Claims

In Column 22, Line 50, Claim 13, before "identifying" delete "A".

Signed and Sealed this
Twenty-first Day of July, 2020

Andrei Iancu
*Director of the United States Patent and Trademark Office*